2,887,356

PRODUCTION OF OXYGEN-FREE AND ANHYDROUS FUSED SALT ELECTROLYTE FROM OXYGEN CONTAINING COMPOUNDS OF URANIUM

Milton J. Arnoff, Cleveland, Ohio, assignor, by mesne assignments, to Horizons Titanium Corporation, Princeton, N.J., a corporation of New Jersey No Drawing. Application September 21, 1955
Serial No. 535,742

7 Claims. (Cl. 23—14.5)

This invention relates to the chemistry of uranium. More particularly, it relates to the preparation of fused salt bath compositions adapted to be electrolyzed to separate the uranium values in the bath as cathode deposited metal whereby the uranium is recovered.

Interest in the production of elemental uranium has been considerably heightened by recent developments in the field of nuclear chemistry. Numerous processes are known for the recovery of uranium from compounds of the metal. U.S. Patent 1,842,254 describes one such process of preparing uranium by electrolytically decomposing a double halogen compound of uranium ($KUF_5$) in a fused bath of alkali metal halides, preferably fluorides. According to this patent, the bath may be prepared by fusing a mixture of purified sodium fluoride and purified potassium fluoride and adding to the fusion mixture a suitable amount of double fluoride of uranium and an alkali metal. The method outlined requires the preparation and purification of several fluorides, an expensive, tedious and difficult operation.

I have discovered a relatively simple method of preparing a fused bath suitable for the electrolytic recovery of uranium. In accordance with my method, instead of alkali metal fluorides, I prepare a fusion from one or more alkali metal chlorides, or from one or more alkaline earth chlorides, including magnesium chloride or mixtures of said chlorides suitably proportioned to melt between 350° C. and 800° C. Many such baths prepared from NaCl, KCl, mixtures of NaCl and KCl, and mixtures of LiCl and KCl and mixtures of KCl and $MgCl_2$, or other alkaline earth chlorides have been employed in my process. Each of these salts is available commercially in sufficiently pure and anhydrous form for my purposes. While further purification of these compounds is usually found to be unnecessary, they may be recrystallized from aqueous or non-aqueous solutions and vacuum dried to insure removal of any gross contamination prior to melting of the bath.

Instead of adding a rare and relatively expensive double fluoride to the bath, I have found that the uranium may be supplied by various oxygen-containing uranium compounds. Suitable compounds include $U_3O_8$, $UO_2$, $UO_3$, both as ignited and unignited oxides, and other oxygen-containing uranium compounds which decompose to yield an oxide of uranium when heated to a temperature such as that of the fused salt baths above mentioned. The nitrate, carbonate, oxalate, acetate and other organic salts have been found applicable to my process.

In accordance with my invention, such oxygen-containing compounds are added either singly or in combination with one another, to a molten pool comprised of at least one alkali metal chloride. When the addition is made, a dispersion or possibly a partial solution of the rare and refractory metal oxide is formed in the fused bath. At the same time, any moisture present flashes off at the elevated temperature of the bath. Other gaseous products may also evolve incident to the decomposition of the uranium compound added. For example, carbon dioxide would be given off by the decomposition of a carbonate or an oxalate and $N_2O_5$ from a nitrate. I have found that when the resulting dispersion or solution is contacted with a suitable chlorinating agent, a reaction occurs in which the desired metal chloride forms in an anhydrous condition in the fused salt bath.

The chlorination reaction may be effected with any suitable chlorinating agent. I have found hydrogen chloride, phosgene, carbon tetrachloride, and chlorine in admixture with either carbon monoxide or carbon to be effective. The chlorinating agent may be brought into contact with the oxygen-containing uranium compound in any convenient fashion. One particularly effective method is to bubble the chlorinating agent, in gaseous form, into the melt, through a perforated inlet tube. Where mixtures of chlorine and carbon are employed, the chlorine may be bubbled into a bath to which finely divided carbon has previously been charged, or the carbon may be carried into the bath in the gas stream.

The chlorination, which proceeds quantitatively may be represented by the following reactions:

$$UO_2 + 4HCl \rightarrow UCl_4 + 2H_2O$$

$$UO_2 + 2COCl_2 \rightarrow UCl_4 + 2CO_2$$

$$UO_2 + 2CO + 2Cl_2 \rightarrow UCl_4 + 2CO_2$$

$$2UO_2 + 2C + 4Cl_2 \rightarrow 2UCl_4 + 2CO_2$$

$$2UO_2 + 3C + 4Cl_2 \rightarrow 2UCl_4 + CO_2 + 2CO$$

$$2UO_2 + 4C + 4Cl_2 \rightarrow 2UCl_4 + 4CO$$

$$UO_2 + CCl_4 \rightarrow UCl_4 + CO_2$$

With other oxygen-containing compounds of uranium, similar equations may be written to indicate the evolution of CO or $CO_2$ or mixtures of CO and $CO_2$ as products of the reaction.

As indicated in the foregoing reactions, any water vapor and oxides of carbon formed as a result of the reaction are readily eliminated from the melt. Hence, the fused mass may be electrolyzed directly in the vessel in which the reaction is effected. It is preferred, however, to operate the reactor continuously by adding additional amounts of the oxygen-containing uranium compound from time to time to the fused bath and by replenishing the alkali metal chloride of the fused melt. Accordingly, portions of the reacted melt are withdrawn periodically and charged into an electrolytic cell constructed of a suitably inert material, wherein the molten material is electrolyzed in a manner well known in the art, under an inert atmosphere, such as helium or argon or under a vacuum.

The following examples will serve to further illustrate the practice of my invention.

*Example I*

A mixture of sodium chloride and potassium chloride in the proportions of their eutectic composition was melted by heating in a vycor tube to 700° C. A quartz sparger through which a flow of hydrogen chloride gas was maintained was immersed in the fused salt. Uranyl nitrate hexahydrate, $(UO_2(NO_3)_2 \cdot 6H_2O)$ was added slowly as small increments to the bath. There was a violent release of water vapor and oxides of nitrogen with each increment added. About 12 grams were added during a five minute interval, during which time hydrogen chloride was continuously added to the bath. The flow of hydrogen chloride was continued for an additional 10 minutes, at the end of which the melt was clear and was reddish in color. The fused salt melt was poured into a porcelain dish, cooled and then analyzed. It was found that the original NaCl—KCl melt now contained about 82% by weight of NaCl+KCl and about 18% $UCl_4$ (by weight)

indicative of the fact that substantially all of the uranium was converted to the tetrachloride. The melt could readily be separated into its components by conventional extraction techniques or, as preferred, it was suitable for electrolytic separation of the uranium as a cathode deposited metal.

*Example II*

A sample of uranyl nitrate hexahydrate was dried at about 200° C. for four hours. During this preliminary treatment most of the water and part of the nitrogen oxides ($NO_2$ and $N_2O_5$) were evolved by decomposition of the salt. The predried material was added to the alkali metal chloride melt. In this instance there was little gas evolution and the addition produced none of the violence characteristic of Example I. The material chlorinated readily in the same manner as the untreated material of Example I.

*Example III*

To illustrate an alternative method of preparing the reaction mixture, about two-thirds of the total uranyl nitrate was mixed with the NaCl—KCl eutectic before melting. The mixture was then heated to fuse all of the components and anhydrous hydrogen chloride was introduced into the melt as before. After the bath cleared, the remaining one-third of the uranyl nitrate was added. This increment had been dried at 200° C. for about 17 hours prior to being added to the bath. The flow of anhydrous hydrogen chloride was continued for 15 minutes past the time the melt had become transparent. The predried uranyl nitrate added to the bath appeared to chlorinate much more slowly than any of that previously tested.

After the flow of hydrogen chloride had been terminated, the fusion was poured into a porcelain crucible and cooled in air. Analysis indicated that about two-thirds of the uranium was completely chlorinated and that about one-third of the uranium was only partially chlorinated. It is possible that the predried material of this example was processed for too long a time and that the reactivity of the uranium was impaired. Another possibility is that the chlorination was not continued for a sufficient time.

I am acquainted with prior efforts to produce chlorides of uranium, such as those reported on pages 463–473 of "The Chemistry of Uranium," published by McGraw-Hill as part of the National Nuclear Energy Series, but insofar as I am aware, I am the first one to successfully prepare oxygen-free uranium-chlorides by effecting the reaction in a fused salt environment as above described.

I claim:

1. A process for producing an oxygen-free uranium chloride, which comprises forming a fused salt bath melting at a temperature between 350° C. and 800° C. and consisting essentially of at least one chloride of the group consisting of alkali metal chlorides and alkaline earth metal chlorides, including magnesium chloride, and at least one oxygen-containing compound of uranium, selected from the group consisting of the oxides and the nitrate, carbonate, oxalate and acetate of uranium, each of which yields an oxide of uranium on heating to the temperature of said fused salt bath; chlorinating the uranium compound in the fused salt bath by contacting it with a chlorinating agent of the group consisting of hydrogen chloride, phosgene, carbon tetrachloride, mixtures of chlorine with carbon monoxide and mixtures of chlorine with carbon, and recovering the uranium chloride formed thereby.

2. A process for producing a fused salt electrolyte containing an oxygen free uranium chloride which comprises forming a fused salt bath melting at a temperature between 350° C. and 800° C. and consisting essentially of at least one chloride of the group consisting of alkali metal chlorides and alkaline earth metal chlorides, including magnesium chloride, and at least one oxygen-containing compound of uranium, selected from the group consisting of the oxides and the nitrate, carbonate, oxalate and acetate of uranium, each of which yields an oxide of uranium on heating to the temperature of said fused salt bath; chlorinating the uranium compound in the fused salt bath by contacting it with a chlorinating agent of the group consisting of hydrogen chloride, phosgene, carbon tetrachloride, mixtures of chlorine with carbon monoxide and mixtures of chlorine with carbon, and recovering the resulting uranium chloride containing halide melt.

3. A process for producing uranium tetrachloride which comprises forming a fused salt bath melting at a temperature between 350° and 800° C. and consisting essentially of at least one chloride of the group consisting of alkali metal chlorides and alkaline earth metal chlorides, including magnesium chloride and at least one oxygen-containing compound of uranium, selected from the group consisting of the oxides and the nitrate, carbonate, oxalate and acetate, each of which yields an oxide of uranium on heating to the temperature of said fused salt bath; chlorinating the uranium compound in the fused salt bath by contacting it with a chlorinating agent of the group consisting of HCl, $COCl_2$, $CCl_4$, mixtures of $Cl_2$ with CO and mixtures of $Cl_2$ with C, and recovering the resulting uranium tetrachloride.

4. A process for producing a fused salt electrolyte containing an oxygen-free uranium chloride which comprises forming a fused salt bath consisting essentially of KCl and NaCl in eutectic proportions and at least one oxygen-containing compound of uranium, selected from the group consisting of the oxides and the nitrate, carbonate, oxalate and acetate of uranium, each of which yields an oxide of uranium on heating to the temperature of said fused salt bath; chlorinating the uranium compound by contacting it in the fused salt bath with a chlorinating agent of the group consisting of HCl, $COCl_2$, $CCl_4$, mixtures of $Cl_2$ with CO and mixtures of $Cl_2$ with C, and recovering the uranium chloride so-formed as a compound dissolved in the fused salt bath.

5. The process of claim 4, in which the uranium compound is uranyl nitrate.

6. A process for producing uranium tetrachloride which comprises forming a fused salt bath melting at a temperature between 350° C. and 800° C. and containing at least one alkali metal chloride and at least one oxygen-containing compound of uranium, selected from the group consisting of the oxides, and the nitrate, carbonate, oxalate and acetate of uranium, each of which yields an oxide of uranium on heating to the temperature of said fused salt bath; chlorinating the uranium compound by contacting it with anhydrous hydrogen chloride in the fused salt bath, and recovering the uranium tetrachloride formed as a fused salt electrolyte.

7. A process for producing uranium tetrachloride which comprises forming a fused salt bath consisting of sodium chloride and potassium chloride and uranyl nitrate, bubbling anhydrous hydrogen chloride through the melt to convert the uranium into an oxygen-free chloride and recovering the oxygen free-chloride.

References Cited in the file of this patent

UNITED STATES PATENTS

| | | |
|---|---|---|
| 1,826,806 | Marden et al. | Oct. 13, 1931 |
| 2,734,795 | Evers | Feb. 14, 1956 |

OTHER REFERENCES

Friend: "Textbook of Inorganic Chemistry," vol. VII, part III, page 295 (1926), publ. by Charles Griffin & Co., Ltd., London.

Katz et al.: "The Chemistry of Uranium," 1st ed., pages 461–488 (1951), National Nuclear Energy Series, McGraw-Hill Book Co., Inc., N.Y.C.